3,782,906
PROCESS FOR PREPARATION OF AGGLOMERATED HYDRATED ALKALI METAL SILICATE GLASS PARTICLES
Richard H. Pierce, Broomall, Pa., assignor to Philadelphia Quartz Company, Philadelphia, Pa.
No Drawing. Filed Nov. 16, 1971, Ser. No. 199,373
Int. Cl. B01f 3/06; C01b 33/32; C01d 11/00
U.S. Cl. 23—313                                          5 Claims

ABSTRACT OF THE DISCLOSURE

Readily soluble, free-flowing hydrated alkali metal silicate glass particles are prepared by feeding fine particles of anhydrous glass into a fluid bed and using steam to expand the bed. The steam hydrates the glass particles and agglomeration takes place.

INTRODUCTION

The preparation of soluble alkali metal silicate glasses has been known and practiced for many years. These glasses are, of course, the basis for the production of sodium and potassium silicate solutions, but they are also articles of commerce by themselves. One of the problems associated with the dissolving of these glasses is the need for high steam pressures and excess of glass to obtain commercially acceptable dissolving rates. This difficulty in dissolving these materials has prevented wider application of alkali metal silicate glasses.

One method that has been suggested numerous times to render these glasses more soluble is to hydrate them; however, such readily soluble hydrated alkali metal silicate glasses have not been available as commercial products. The problems associated with such glasses, including caking, and incomplete or difficult solubility, are generally related to inhomogeneous distribution of water throughout the glasses. A method has been found to hydrate alkali metal silicate glasses to produce particles that are uniformly hydrated and that are readily and almost completely soluble. The method involves feeding fine alkali metal silicate glass powder into a fluid bed chamber in which the particle bed is expanded by flowing steam upward through the chamber. The moisture and heat supplied by the steam enables the glass particles to hydrate readily. In subsequent chambers the hydrated glass is equilibrated, agglomerated and cooled.

The products of the process are free-flowing granular powders that are readily soluble and can be used in many applications including use as detergent builders.

THE INVENTION

The finely divided alkali metal silicate glass used in this invention can be prepared by any method, such as the fusion of an alkali metal carbonate with a source of silica. The $SiO_2/M_2O$ mole ratio of the glass can be between 1.2/1.0 and 4.0/1.0; M stands for an alkali metal or combination of alkali metals. Combinations of glasses with different ratios can also be used. The particle size of the glass is important, the particles should all be finer than 48 mesh (Tyler series screens) and preferably smaller than 100 mesh. If the particle size of the glass is too large the gas flow needed to expand the fluid bed is excessive. Also the time needed for hydration and equilibration of large particles would be much longer. Silicate glasses that have been ground in ball mills and the like are useful in this invention but other methods of sub-dividing the glasses also yield useful particles. Such methods include thermal stressing of thin glass films as described in a copending patent application S.N. 153,806 and chopping fine fibers of silicate glass or atomizing molten glass as described in a copending patent application S.N. 129,107.

This process utilizes 3 fluid bed chambers for hydrating, equilibrating and agglomerating alkali metal silicate glass particles; another chamber is required to cool the product.

These chambers consist of containers in which a bed of particles can be suspended in a stream of glass emanating from the bottom of the container. I prefer to use cylindrical chambers to eliminate entrapment and build-up of particles in corners. The gas stream is dispersed by flowing through screening and a grid cap. The gas is exhausted through the top of the chamber and fed into a cyclone separator to recover any fines carried out. The processed material cascades over a weir into a bagger or into another processing chamber.

In the first chamber a bed of fine alkali metal silicate glass particles is suspended in a dispersed steam flow to form a fluid bed. A temperature between 110 and 180° C. is maintained in the chamber. The fine glass particles are introduced into the chamber at ambient temperature by any suitable means, such as for example, a screw conveyor. The entry port for the particles is located near the grid cap so that the particles can rise through the chamber. The rate of addition of particles is adjusted so that the particles remain dispersed and little agglomeration takes place in this chamber. The steam partially condenses on the room temperature particles and as they are heated they begin to hydrate. The hydrating particles rise through the first chamber and exhaust into a second chamber.

In the second chamber warm moist air is used to maintain the expanded particle bed. The air can have a temperature between 80 and 130° C. with a relative humidity between 40 and 80%. The conditions should be adjusted so that the glass particles do not gain or lose moisture in this chamber but the water absorbed in the first chamber is equilibrated. This chamber is somewhat smaller than the first chamber so that the bed density is increased and the possibility of contact between the particles is increased. In this way as the particles develop adherent surfaces agglomerates with survival strength are formed.

In the third chamber the expanded bed is maintained with warm dry air to complete moisture equilibration and evaporate any excess surface moisture. The temperature is maintained between 70 and 90° C. This chamber is smaller than the second chamber to further and complete the agglomeration.

The fourth chamber is a cooler. Cool air is used to maintain the fluid bed and cool the hydrated glass particles until they become non-adherent. It is advantageous to maintain a relative humidity of about 30% in this chamber to prevent overdrying. However, the humidity should not be too high or the product will be sticky. Other tumbling or contact coolers can be employed to cool the product and prevent caking.

Upon discharge from the cooler the particles have a temperature of less than 35° C., are free-flowing, and have varying particle sizes. Some of the fine silicate glass powders have been hydrated but have not been agglomerated; these particles are screened out and are recycled to the second chamber of the process. Most of the particles, however, have been hydrated and agglomerated so that they are in the 10 to 65 mesh size range. The bulk density of these particles can vary between 50 and 70 lbs./cu. ft. The moisture content can be between 5 and 25% and the hydrated glass agglomerates are not sticky, do not cake under moderate pressure and are uniformly soluble indicating that the moisture contained by the particles is well equilibrated. The particles are fast dissolving and contain very little insoluble matter.

These hydrated silicate glass particles are useful in such diverse applications as water treatment, corrosion prevention, brick manufacture, clay refining or ceramic and refractory binders. These materials are also useful in detergent compositions in which they are included as builders and corrosion prevention agents.

EXAMPLES

A further understanding of the present invention can be obtained from the following examples which illustrate certain embodiments of the invention and should not be considered restrictive. The $SiO_2/M_2O$ ratios are on a mole basis, all other proportions are in parts by weight (p.b.w.).

The fluid bed drying system used in the examples consisted of 4 cylindrical chambers. The first chamber had a diameter of 2 feet and a height of 6 feet. The second chamber had a diameter of 1.5 feet and a height of 5 feet. The third and fourth chambers were 1 foot in diameter and 4 feet in height. The steam enters the first chamber at a velocity of 100 to 250 feet/minute, and the warm air enters the second and third chambers at about the same velocity. The cool air enters the cooling chamber at about 150 feet/minute.

EXAMPLE 1

Hydrated sodium silicate glass particles were produced by the following method. Sodium silicate glass with a 2.0 $SiO_2/1.0$ $Na_2O$ ratio and a particle size such that 91% passed through 100 mesh screening (Tyler series screens) was fed into the first chamber at rate of 100 p.b.w/hour. The steam pressure was adjusted so that the velocity of the steam through the grid cap was 110 ft./min. and the temperature of the fluid bed was 140° C. The particles rose through the chamber and exhausted over a weir into the second chamber. The velocity of the warm moist air up this chamber was 125 ft./sec. and the temperature was 110° C. The relative humidity was maintained at about 60%. Some agglomeration took place in this chamber but most of the particles remained discrete. The material rose through this chamber and continuously exhausted over a weir into a third chamber. In this smaller chamber agglomeration took place as the particle bed was expanded with a stream of dry air at a velocity of 100 ft./min. and a temperature of 85° C. Any excess surface mixture was evaporated from the surface. The particles were exhausted into the fourth cooling chamber in which they were cooled with 25° C. air.

The product was screened and 32% of the particles were finer than 65 mesh and were recycled into the second chamber. The remainder of the particles were in the 10 to 65 mesh size range and had a bulk density of 61 lbs./cu. ft. The glass particles were free-flowing and did not cake under moderate pressure. The moisture content was 14.7% and the particles were uniformly and rapidly soluble. These properties indicate that the water contained by the glass was well equilibrated and well distributed throughout the glass. The glass particles dissolve with only 0.21% undissolved when 5 g. were dissolved in 95 g. of water at 90° C. for 5 minutes.

EXAMPLE 2

Sodium silicate glas particles with a 2.4 $SiO_2/1.0$ $Na_2O$ ratio and a particle size such that 100% of the material passed through a 65 mesh screen was subjected to the process of Example 1. The product discharged from the cooler was screened and 28% of the material was found to be finer than 65 mesh and was recycled to the second chamber. The remainder of the particles were in the 10 to 65 mesh size range and had a bulk density of 65 lbs./cu. ft. The glass particles were free-flowing and did not cake under moderate pressure. The moisture content was 13.9% and the particles were uniformly and rapidly soluble. These properties indicate that the water is contained by the glass was well equilibrated and well distributed throughout the glass. The glass particles dissolve with only 0.27% remaining undissolved under the test conditions of Example 1.

EXAMPLE 3

A potassium silicate glass with a 3.9 $SiO_2/1.0$ $K_2O$ ratio and a particle size such that 87% of the material passed through a 100 mesh screen was fed into the first chamber at a rate of 150 p.b.w./hour. The steam pressure was adjusted so that the velocity of the steam through the grid cap was 195° ft./min. and the temperature of the fluid bed was 160° C. The particles rose in the chamber and exhausted into the second chamber. The velocity of the warm moist air was 130 ft./min., the temperature was 120° C. and the relative humidity was 55%. Some agglomeration took place in this chamber but most of the particles remained discrete. The material rose through the chamber and was exhausted into the third chamber. In this small chamber agglomeration took place as the particle bed was evpanded with a stream of dry air at 87° C. and a velocity of 107 ft./min. Any excess surface moisture was evaporated from the surface. The particles were exhausted into the fourth, cooling chamber in which they were cooled with 25° C. air.

The product discharged from the cooler was screened and 38% of the material was found to be finer than 65 mesh and was recycled into the second chamber. The remainder of the particles were in the 10 to 65 mesh size range and had a bulk density of 66 lbs./cu. ft. The glass particles were free-flowing and did not cake under moderate pressure. The moisture content was 11.7% and the particles were rapidly and uniformly soluble. These properties indicate that the water contained by the glass was well equilibrated and well distributed throughout the glass. The glass particles dissolve with only 0.18% remaining undissolved under the test conditions of Example 1.

EXAMPLE 4

A sodium-potassium silicate glass powder with a 2.4 $SiO_2/0.9$ $Na_2O+1$ $K_2O$ ratio and a particle size such that 100% of the material passed through a 65 mesh screen was subjected to the process of Example 3. The product discharged from the cooler was screened and 34% of the material was found to be finer than 65 mesh and was recycled to the second chamber. The remainder of the particles were in the 10 to 65 mesh size range and had a bulk density of 63 lbs./cu. ft. The glass particles were free-flowing and did not cake under moderate pressure. The moisture content was 12.1% and the particles were rapidly and uniformly soluble. These properties indicate that the water contained by the glass was well equilibrated and well distributed throughout the glass. The glass particles dissolved with only 0.25% remaining undissolved under the test conditions of Example 1.

EXAMPLE 5

A spray dried detergent of low phosphate content was prepared using the product of Example 4. The following ingredients were blended in a crutcher at 70° C.

| | P.b.w. |
|---|---|
| Surfactant paste (28% linear dodecylbenzene sulfonate, 22% $Na_2SO_4$ and 50% $H_2O$) | 64.0 |
| Sodium tripolyphosphate | 35.0 |
| Sodium glucoheptonate (organic sequestering agent) | 10.0 |
| Sodium-potassium silicate glass of Example 4 (2.4 $SiO_2/0.9$ $Na_2O+0.1$ $K_2O$, 12.1% $H_2O$) | 15.0 |
| Sodium carboxymethyl cellulose (anti-redeposition agent) | 1.5 |
| Blancophor RG (optical brightener, GAF Corp.) | 0.3 |

The materials were blended for 10 minutes and then spray dried to about 10% water content. The free-flowing granules dissolved completely in household washing machines and were effective in removing soil from laundry.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as canged proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. The production of homogeneous free-flowing hydrated alkali metal silicate glass agglomerates characterized by rapid and uniform solubility, said glass selected from the group consisting of sodium silicate, potassiom silicate and sodium-potassium double silicates having an $SiO_2/M_2O$ mole ratio of 1.2 to 4.0/1.0 comprising the steps of:
    (a) introducing into a first chamber maintained at 110° to 180° C. a bed of fine alkali silicate glass particles suspended in a dispersed steam flow to form a fluid bed,
    (b) causing hydration of said particles to commence,
    (c) introducing said partially hydrated particles as an expanded particle bed into a second chamber maintained at 80° to 130° C. with a relative humidity of 40 to 80,
    (d) causing said particles to become equilibrated with respect to the water absorbed in said first chamber,
    (e) causing agglomerates to form as the moving particles contact one another,
    (f) introducing said equilibrated particles as an expanded bed into a third chamber maintained at 70° to 90° C. to complete equilibration and evaporate any excess moisture,
    (g) causing completion and compaction of said agglomerates;
    (h) introducing said agglomerated and equilibrated particles into a fourth chamber maintained at about 30% relative humidity and below 35° C. in order to cool said agglomerates without over drying, and
    (i) removing the product containing 5 to 25% moisture with a bulk density of 50 to 70 lbs./cu. ft.

2. The process of claim 1 wherein the glass particles introduced into the first chamber are finer than 48 mesh.

3. The process of claim 1 wherein the glass particles introduced into the first chamber are finer than 100 mesh.

4. The process of claim 2 wherein the glass particles are sodium silicate.

5. The process of claim 2 wherein the glass particles are potassium silicate.

References Cited
UNITED STATES PATENTS

| | | | |
|---|---|---|---|
| 3,340,018 | 9/1967 | Otrholels | 23—313 |
| 2,941,947 | 6/1960 | Schauer | 23—313 |
| 3,231,413 | 1/1966 | Berquin | 23—313 |
| 3,579,299 | 5/1971 | Sams | 23—110 A |

NORMAN YUDKOFF, Primary Examiner

S. J. EMERY, Assistant Examiner

U.S. Cl. X.R.

23—302; 252—135; 264—117; 423—332